July 22, 1941.   R. S. GRUBE   2,250,159

GLASS CUTTER

Filed Nov. 1, 1939

INVENTOR
Russell S. Grube
John A. Naismith
ATTORNEY

Patented July 22, 1941

2,250,159

UNITED STATES PATENT OFFICE 2,250,159

GLASS CUTTER

Russell S. Grube, San Jose, Calif., assignor of one-third to Charles L. Bean, San Jose, Calif., and one-third to Lelande Quick, Los Angeles, Calif.

Application November 1, 1939, Serial No. 302,369

2 Claims. (Cl. 49—52)

The present invention relates particularly to means for cutting glass having a tubular form.

In order to fully describe the nature of the present invention and to fully disclose the manner in which it is practically applied, reference is hereinafter particularly made to tubular glass objects, but it will be understood that the device may be successfully applied to solid or tubular elements having a circular, or substantially circular conformation at the point to which it is applied, and having a glass like physical structure.

In effecting the separation at a given point of a glass tube, it is common practice to score the tube lightly with a file around the entire circumference of the tube and then break the same on the line of the scored circle. But this process is not at all satisfactory because the useful life of a file so used is short, it rapidly losing its cutting edge; the break in the tube is not clean and smooth; objectionable fragments of glass are sometimes released; and, perhaps due to faulty scoring of the glass, the tube will break at a point more or less remote from the point of the scoring.

It is, therefore, one object of the present invention to provide means whereby a glass tube or similar element may be so scored that a smooth, clean, circular break may be effected.

It is another object of the invention to provide means of the character indicated constructed and arranged to operate upon circular elements of various sizes.

It is also an object of the invention to provide a device of the character indicated that will be simple in form and construction, economical to manufacture, quickly and easily adjusted to operate upon circular elements of varying diameters, that consists of few parts, and that is strong, durable, and highly efficient in its practical application.

Figure 1:
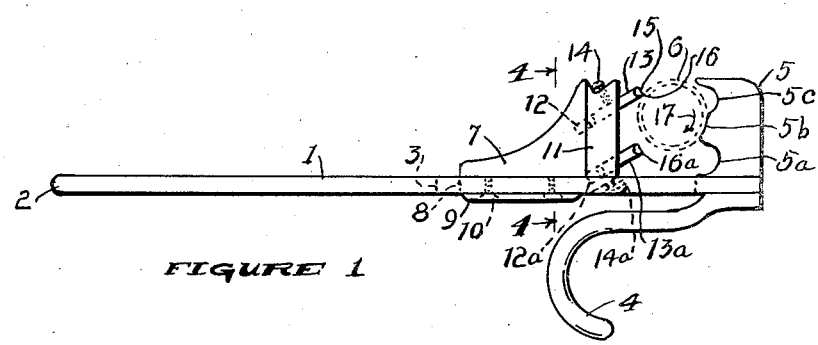
Figure 1 is a side elevation of a device embodying my invention.
Figure 2:
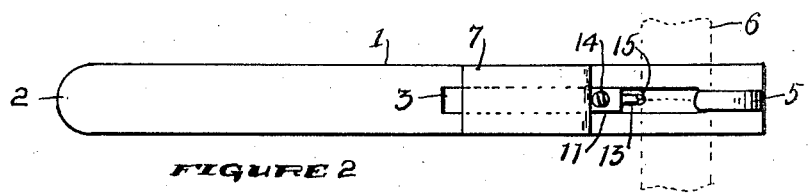
Figure 2 is a plan view of the same.
Figure 3:
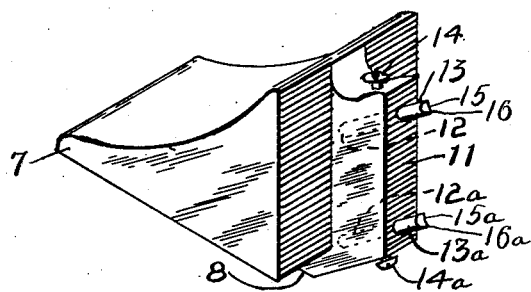
Figure 3 is a perspective illustration of the cutter-carrying adjustable member.
Figure 4:
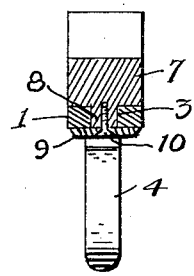
Figure 4 is a sectional view of the device taken on line 4—4 of Figure 1.

Referring now more particularly to the drawing, I show at 1 an oblong flat member providing a handle at 2, and having a slot 3 formed therein to extend lengthwise of the member at the end remote from the handle as shown.

Fixedly mounted upon, and depending from, the under side of the member 1 and at the end remote from the handle 2 is a finger piece 4, for the purpose hereinafter more fully described.

Rigidly mounted upon the forward end of member 1 to lie in a plane normal to the plane of the member and bisecting the same longitudinally, is an upstanding supporting element 5. The rear edge of this element, that is the edge directed toward the handle, is designed to support a tube, as 6, during the scoring operation, and therefore is formed in several arcuate sections as shown at 5a, 5b, and 5c.

In the present instance the supporting edge 5b has a radius equal to that of the tube 6 but it may be used to support tubes of smaller or larger diameters than the one shown, and likewise each of the other sections is intended to accommodate tubes of varying diameters, so that tubes varying from the very small to the large may be supported and scored by the same device.

At 7 is shown a shoe provided with a bottom flange 8 adapted to engage and slide in the slot 3. The shoe 7 has a width substantially equal to the width of member 1 and slides easily on its upper surface, and is held in place by means of a plate 9 underlying the member 1 and secured to flange 8 by screws 10.

Projecting forwardly from the front face of the shoe 7 is a vertical rib 11, and formed in this rib are sockets 12 and 12a. Each socket extends downwardly and inwardly from the front face of the rib at an angle of substantially thirty degrees from the horizontal as shown. In each socket is placed a cutter pin as at 13 and 13a held fixedly in position by set screws as 14 and 14a.

Each pin, as 13, is formed of suitably hard metal, or any material having desired cutting characteristics, in the present case hard steel, and has each end bevelled from opposite sides to form edges as 15. By forming the ends of the pins in this manner and positioning them as described the pin in use, as 13, will present a sharp cutting point 16 to the tube against which it is placed. Also, by shaping the pins in this manner each pin is provided with four cutting points, any one of which may be brought into use by changing the position of the pin, and a fresh cutting point may be quickly substituted for a worn one.

In its practical application the device is held in one hand with one finger engaging the finger-piece 4 and the thumb resting on the rear curved surface 16 of the shoe 7. The operator then places the tube to be cut, as 6, in position on the supporting edge 5b at the point where the scoring is to be done. With the member 1 being held against forward movement by the finger engaging part 4 the cutting point 16 of pin 13 is moved into contact with the tube by a forward pressure of the thumb on shoe 7. When the desired contact is effected the tube is rotated in the direction indicated by arrow 17 with the result that the tube is scored in a perfect circle along which it may be smoothly and cleanly broken.

A tube placed against supporting edge 5c may be scored by 13 in like manner, and a tube placed against supporting edge 5a may be scored by the pin 13a.

While the cutting point 16 is described as being formed on pin 13 in one specific way it is obvious that the end of the pin may be variously formed to provide a cutting point, but the form described is considered at the present time to be the most satisfactory.

Figure 5:
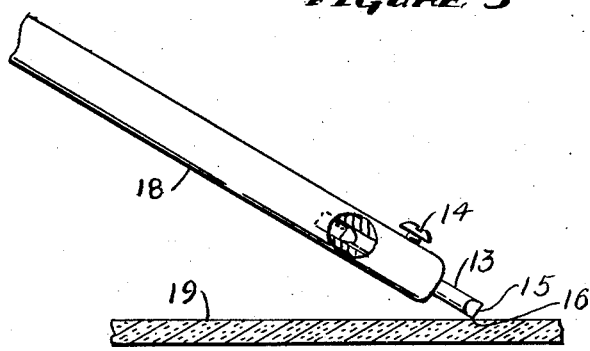
Figure 5 is an illustration showing how the cutter element may be applied to the scoring of flat sheet glass.

In Figure 5 it is shown that the pin 13 may be mounted in an ordinary straight holder as at 18 and when so mounted may be used to score flat glass as 19. I have found that this type of cutting pin will make a uniformly even unbroken score in the surface of the glass when drawn across it but once.

Although certain specific embodiments of the invention have been illustrated and described herein, it will be understood that various alterations in the details of construction and mode of operation may be made without departing from the scope of the invention as indicated in the appended claims.

I claim:

1. A device for circumferentially scoring a circular glass object comprising, a supporting member having a handle formed on one end and an upstanding part on its other end, said part having a surface formed thereon in opposed relation to the handle to provide a seat for the object and upon which it may be rotated, a shoe slidably mounted on said member in opposed relation to said part and between said part and the handle, said shoe having a scoring device mounted thereon in opposed relation to said upstanding part and a thumb receiving surface formed on the side directed toward the handle, and said member having a finger engaging element associated with the end remote from the handle.

2. A device for circumferentially scoring a circular glass object comprising, a supporting member having a handle formed on one end and an upstanding part on its other end, said part having a surface formed thereon in opposed relation to the handle to provide a seat for the object and upon which it may be rotated, a member adjustably mounted on the supporting member in opposed relation to said upstanding part and between said part and the handle, said adjustable member having a scoring device mounted thereon in opposed relation to said upstanding part and a thumb receiving surface formed on the side directed toward the handle, said supporting member having a finger engaging element associated with the end remote from the handle.

RUSSELL S. GRUBE.